G. P. CARROLL & F. N. ROEHRICH
AUTOMATIC CONDENSER.
APPLICATION FILED JUNE 29, 1910.
1,115,502.
Patented Nov. 3, 1914
12 SHEETS—SHEET 9.
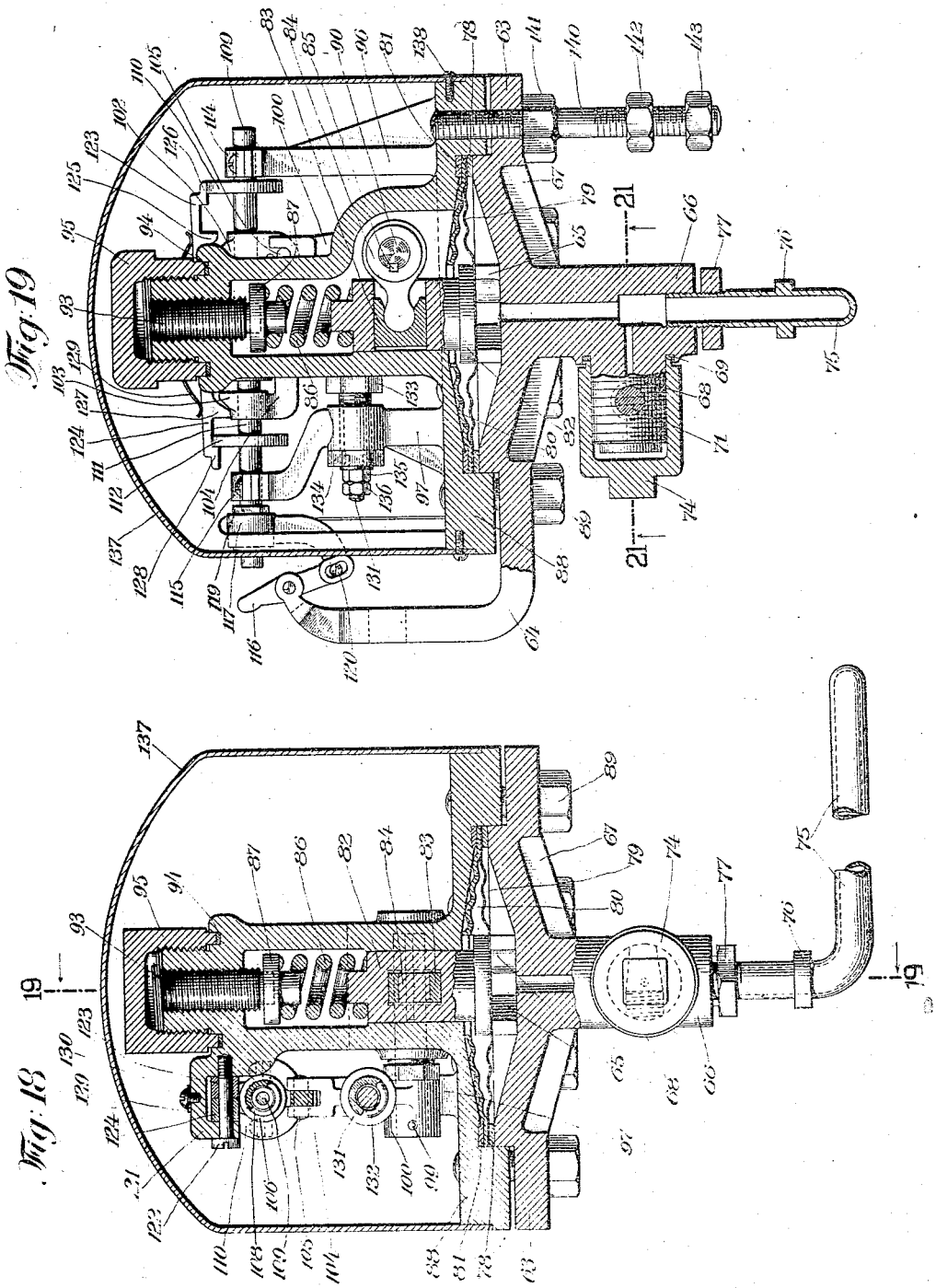
Witnesses:
John E. Prager
Jesse H. Swiedler
Inventors
George P. Carroll
Frank N. Roehrich G. P. CARROLL & F. N. ROEHRICH.
AUTOMATIC CONDENSER.
APPLICATION FILED JUNE 29, 1910.
1,115,502.
Patented Nov. 3, 1914.
12 SHEETS—SHEET 10.
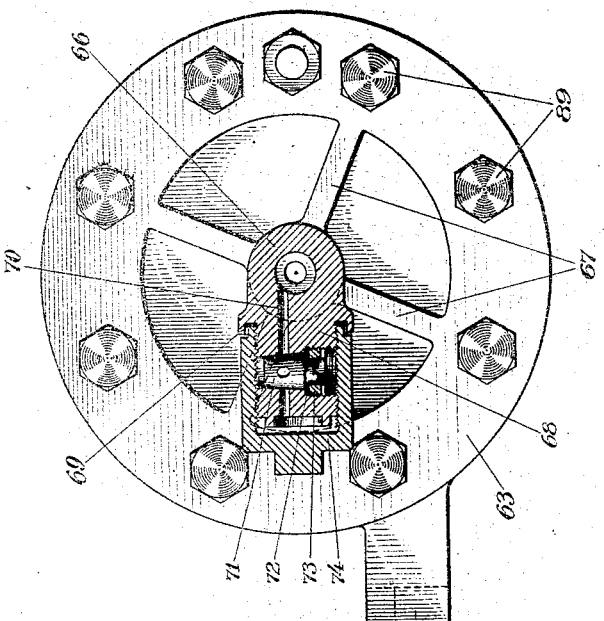
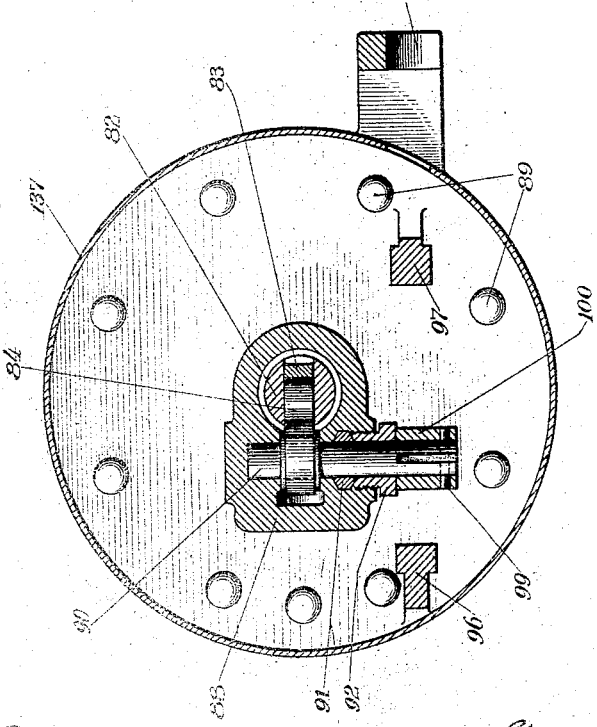

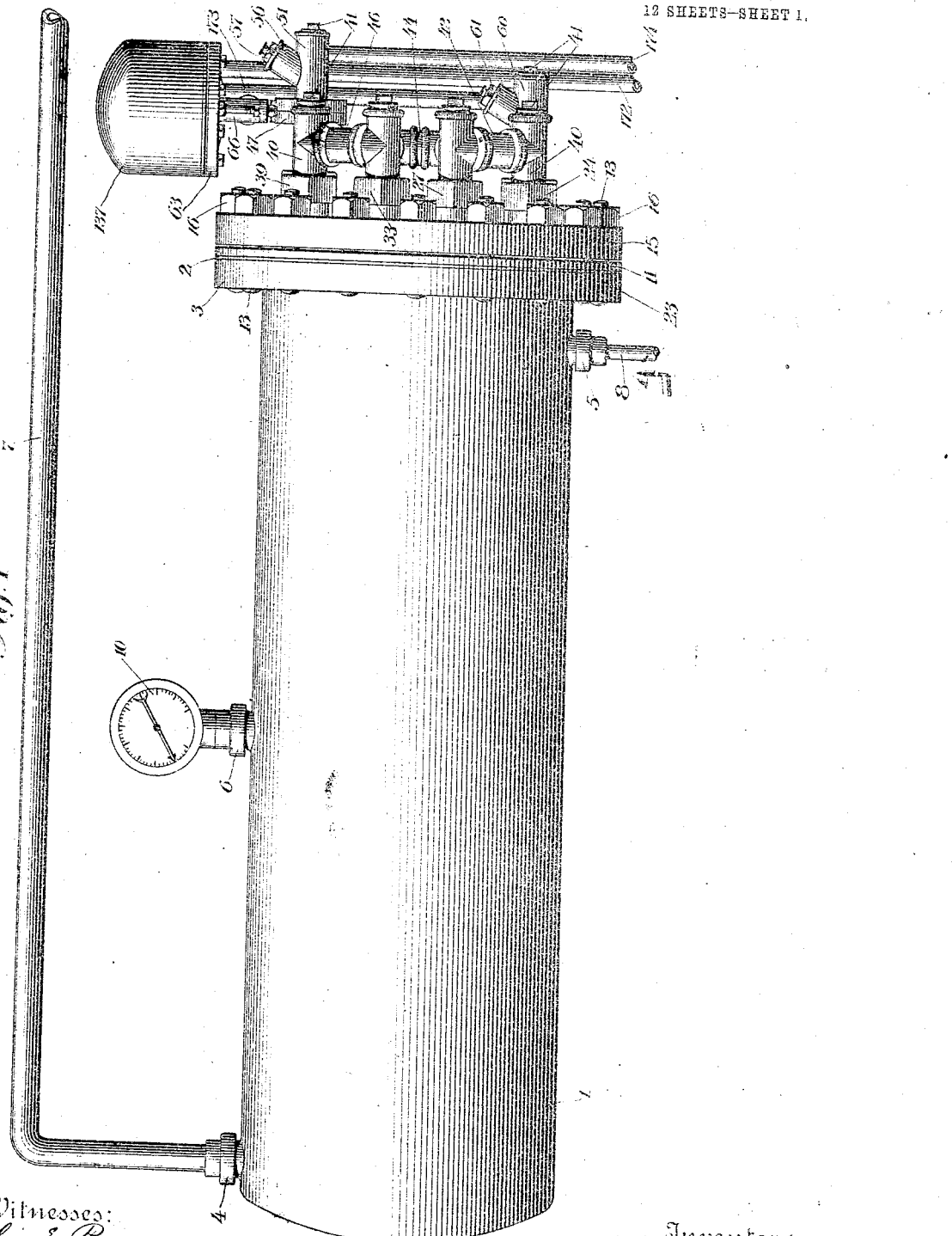

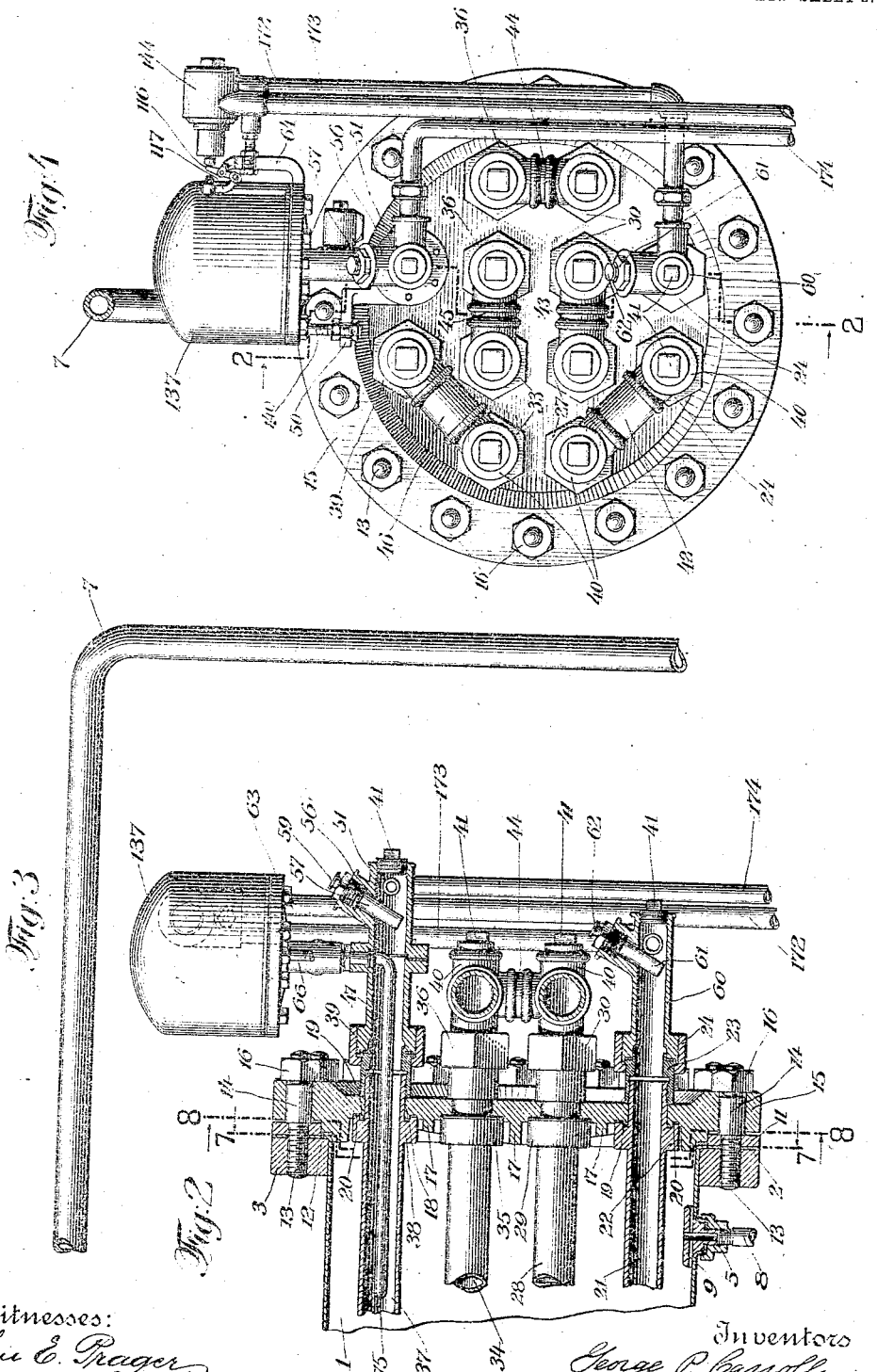

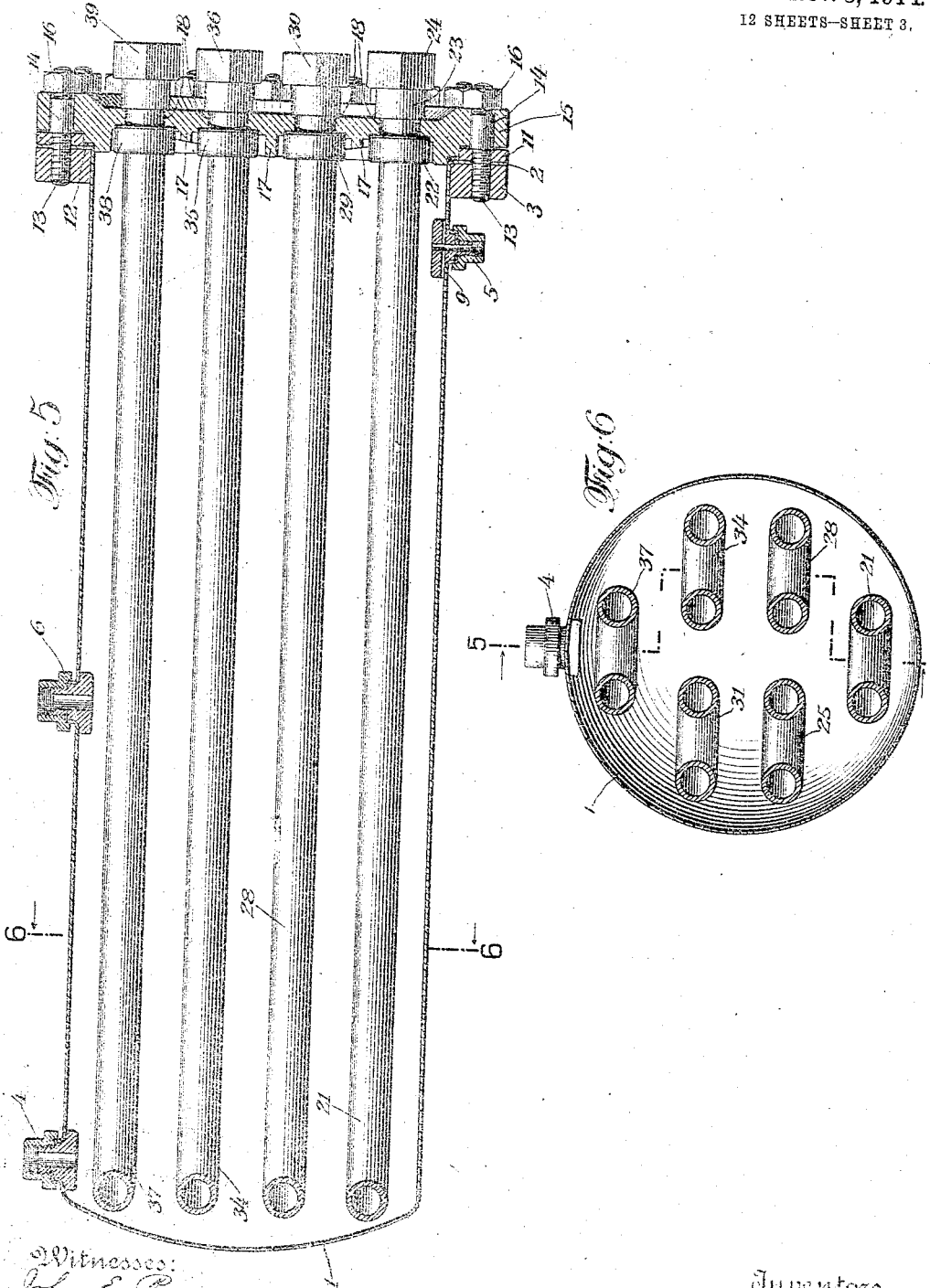

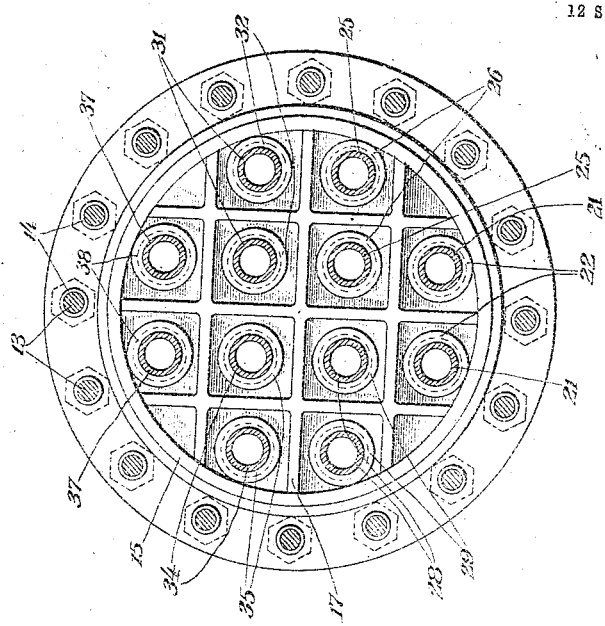
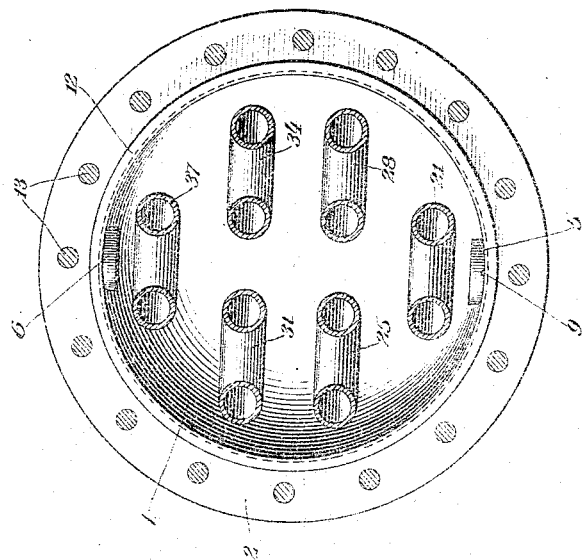

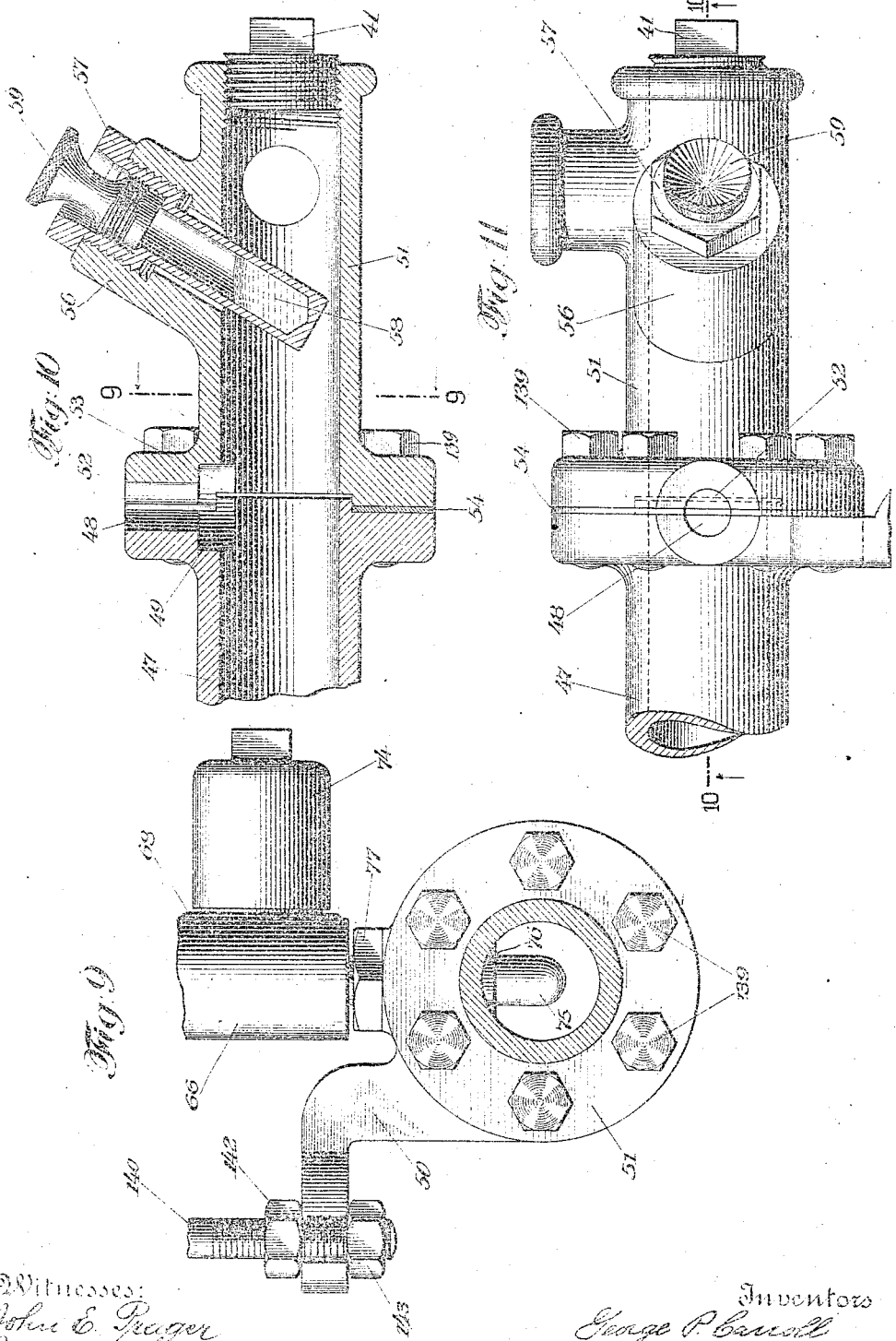

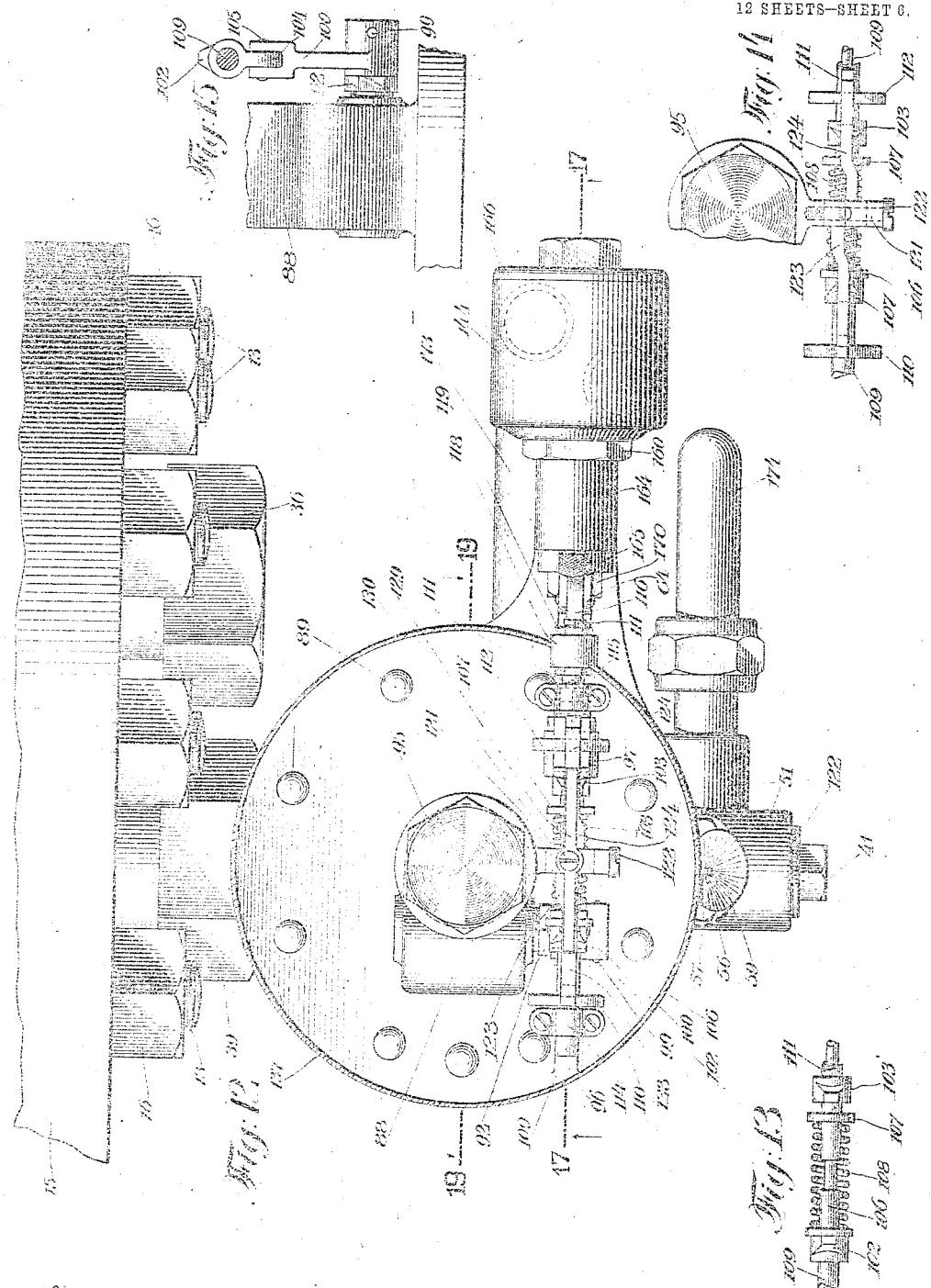

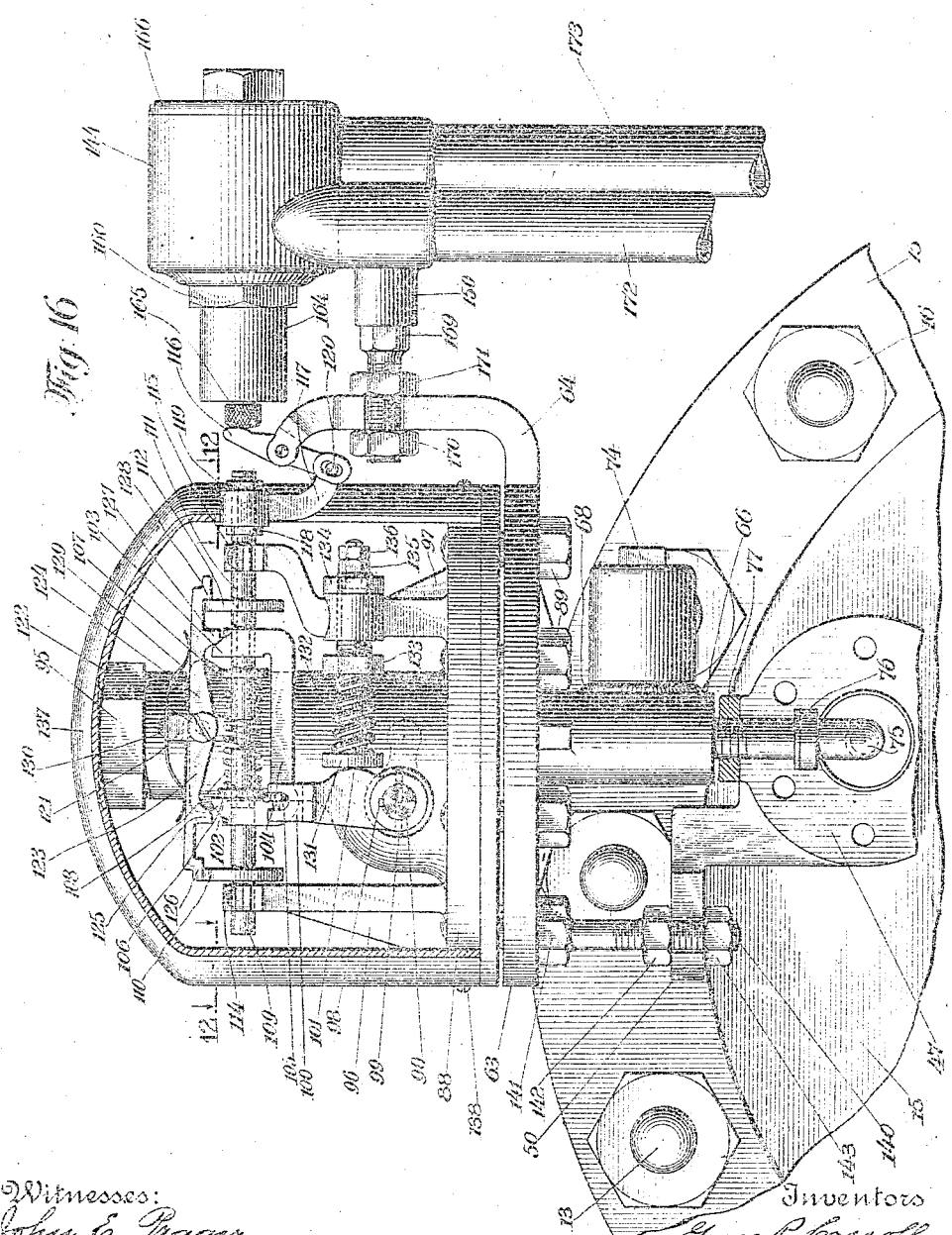

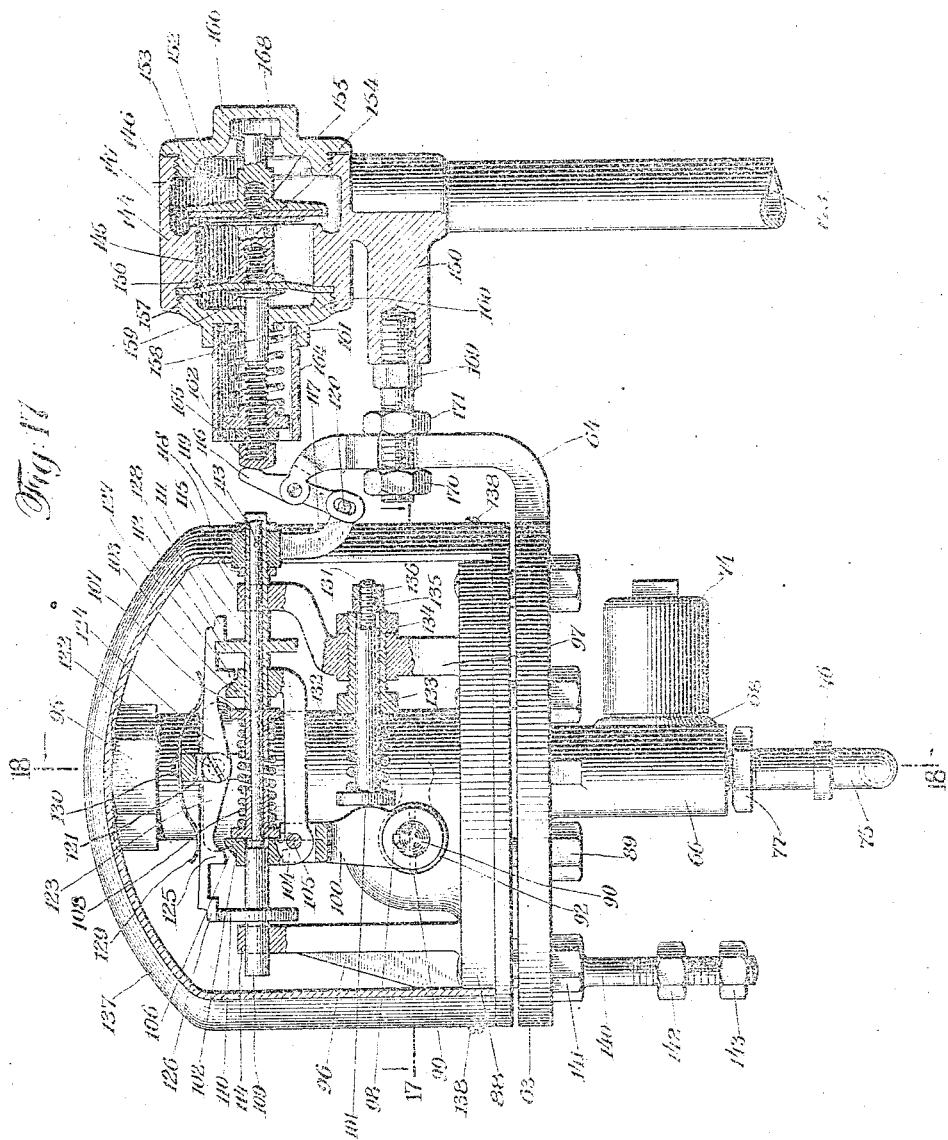

G. P. CARROLL & F. N. ROEHRICH.
AUTOMATIC CONDENSER.
APPLICATION FILED JUNE 29, 1910.
1,115,502.
Patented Nov. 3, 1914.
12 SHEETS—SHEET 11.
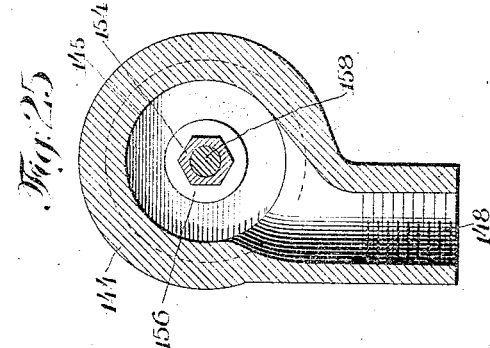
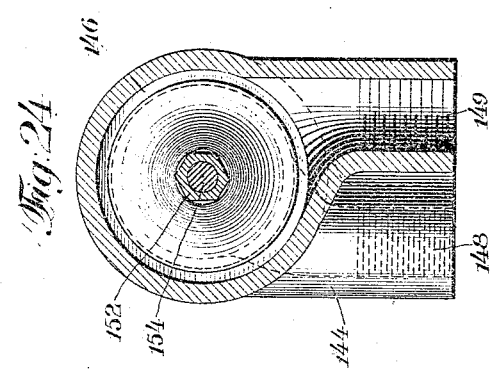
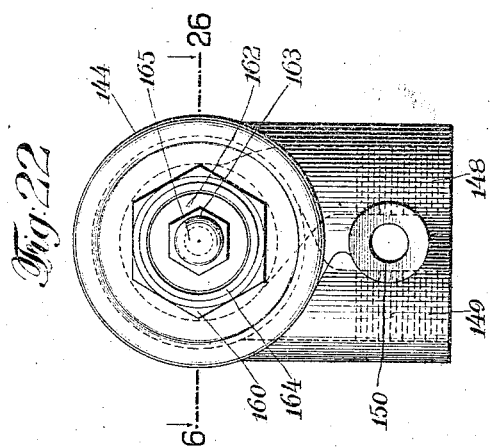
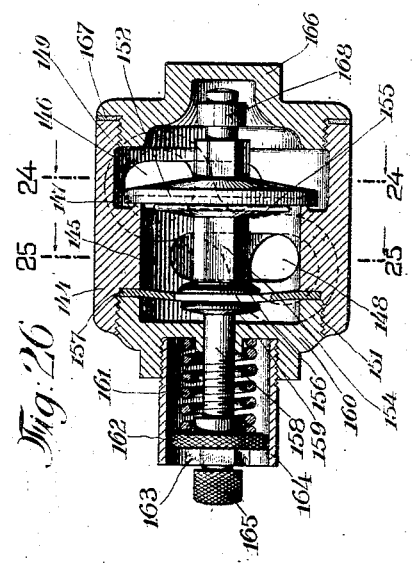
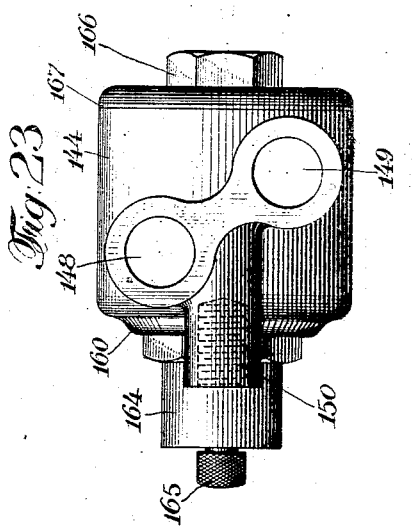
Witnesses:
John E. Prager
Jesse H. Swiedler
Inventors
George P. Carroll
Frank N. Roehrich

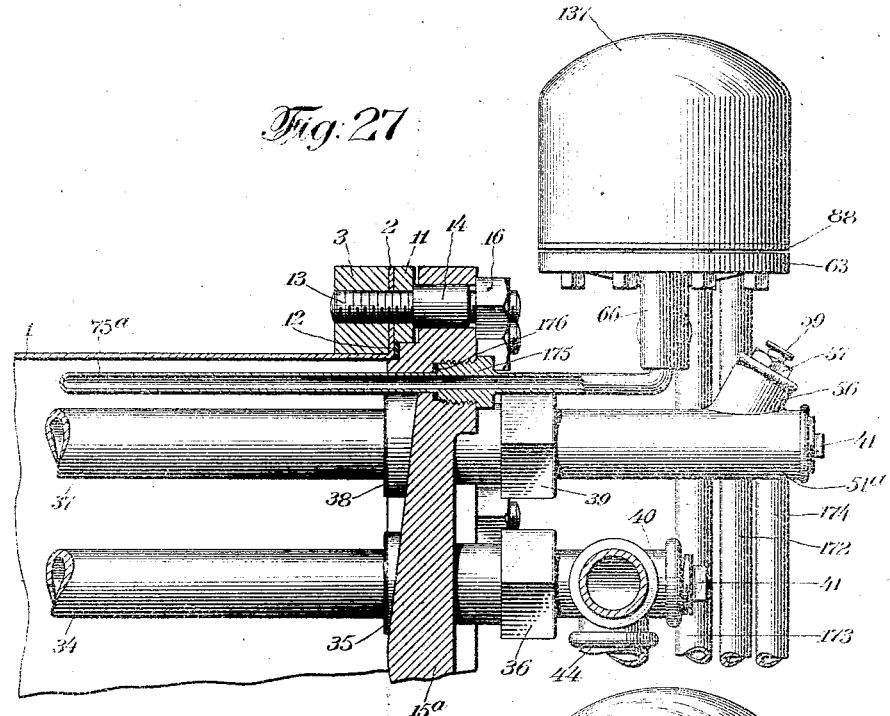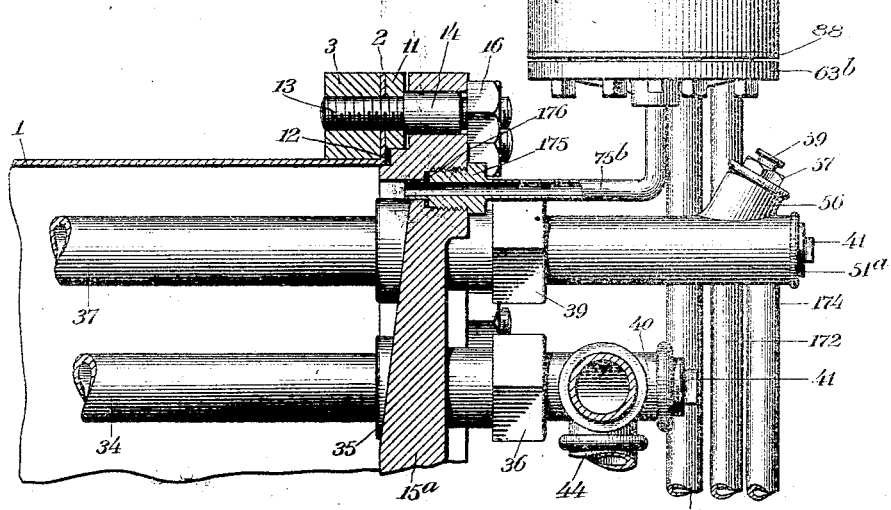

UNITED STATES PATENT OFFICE.

GEORGE P. CARROLL, OF BRIDGEPORT, CONNECTICUT, AND FRANK N. ROEHRICH, OF JERSEY CITY, NEW JERSEY; SAID ROEHRICH ASSIGNOR TO SAID CARROLL.

AUTOMATIC CONDENSER.

1,115,502.  Specification of Letters Patent.  Patented Nov. 3, 1914.

Application filed June 29, 1910. Serial No. 569,530.

*To all whom it may concern:*

Be it known that we, GEORGE P. CARROLL and FRANK N. ROEHRICH, citizens of the United States, and residents, respectively, of Bridgeport, Fairfield county, State of Connecticut, and of Jersey City, Hudson county, State of New Jersey, have invented a new and useful Automatic Condenser, of which the following is a specification.

Our invention relates in general to improvements in apparatus for reducing the temperatures and pressures of gases expelled from stills and compressors and, in case of commercially liquefiable gases, for liquefying such gases.

More particularly our invention relates to improvements in apparatus which employ the kinetic energy of gas particles, when rising to a predetermined limit, to turn on a supply of cooling water to condense the gas and, when falling to a predetermined limit, to shut off such supply.

Our purpose is to construct a condenser, with an automatic controller, such that, when the temperature or pressure of the gas in the condenser reaches a certain high limit, the controller will immediately turn on a full supply of condensing water, and, when such temperature or pressure falls to a certain low limit, the controller will immediately shut off such supply; and to accomplish this result with certainty whether the pressure of the water in the supply mains is high or low.

Our purpose also is to make certain improvements in the detail construction of condensers of the shell type, such as will appear.

In the drawings Figure 1 is a front elevation of one form of our invention with its pipe connections. Fig. 2 is a partial vertical section and a partial front elevation of the structure of the preceding figure as seen through the line 2—2 of Fig. 4, looking toward the right. Fig. 3 is part of a pipe leading from a still or compressor. Fig. 4 is a right end elevation of the structure of Fig. 1 and a section of the pipe of Fig. 3, looking toward the left. Fig. 5 is a vertical section through the line 5—5 of Fig. 6, looking toward the right, but with some of the minor parts in elevation. Fig. 6 is a vertical section through the line 6—6 of the preceding figure, looking toward the left. Fig. 7 is a vertical section through the line 7—7 of Fig. 2, looking toward the left, with a gasket 12 in place but with the condenser head and its connections removed. Fig. 8 is a vertical section through the line 8—8 of Fig. 2, looking toward the right, but with the entire condenser head in elevation and the parts connected with it removed. Fig. 9 is a vertical section of a water outlet through the line 9—9 of the succeeding figure, looking toward the left, and a right end elevation of certain adjacent parts, shown also in Fig. 4 and here much enlarged. Fig. 10 is a partial vertical section and a partial front elevation of the water outlet of the preceding figure and of certain adjacent parts, similarly shown in Fig. 2 and also through the line 10—10 of the succeeding figure, looking upward. Fig. 11 is a plan view of the structure of the preceding figure. Fig. 12 is a plan view of our quick motion controller, but with its cover sectioned through the line 12—12 of Fig. 16, and of a balanced water valve, together with certain adjacent parts also shown in Fig. 4 on a much smaller scale. Fig. 13 is a horizontal section of a motor spring 108 and a plan view of certain adjacent parts. Fig. 14 is a plan view of said motor spring and of certain parts above and adjacent to it. Fig. 15 is a front elevation of a lever 100 and of certain adjacent parts, but with an actuating rod 109 in section. Fig. 16 is a right end elevation of some of the parts shown in Fig. 12 and a vertical section of the controller through the line 17—17 of that figure, looking upward, with some of the controller parts in elevation. Fig. 17 is a vertical section of the controller and of the valve through the line 17—17 of Fig. 12, looking upward, with certain parts in elevation. Fig. 18 is a central vertical section through the lines 18—18 of Fig. 17, looking toward the left, with, however, some of the lower parts in elevation. Fig. 19 is a central vertical section through the line 19—19 of Fig. 12, looking downward and with some of the minor parts in elevation; and it is also a similar central vertical section and elevation through the line 19—19 of the preceding figure, looking toward the left. Fig. 20 is a horizontal section of the controller through the line 20—20 of Fig. 17, looking downward, but with certain moving parts in plan view. Fig. 21 is a horizontal section through the line 21—21 of Fig. 19, looking upward, but with a valve 71 and the upper adjacent non-sectioned parts shown in full. Fig. 22 is a front elevation of the balanced water valve shown in Figs. 4, 12, 16 and 17. Fig. 23 is a bottom view of the same valve. Fig. 24 is a vertical section of the valve through the line 24—24 of Fig. 26, looking toward the left. Fig. 25 is a vertical section through the line 25—25 of Fig. 26, looking toward the left. Fig. 26 is a horizontal section through the line 26—26 of Fig. 22, looking downward, but with certain interior parts in plan view. Fig. 27 is a partial vertical section and a partial front elevation of one modified form of our invention, the view being similar to that of Fig. 2. Fig. 28 is a partial vertical section and a partial front elevation of another modified form of our invention, this view also being similar to that of Fig. 2.

First considering Figs. 1 to 26 inclusive. A condenser shell 1 is preferably made of cold drawn mild steel so as to have a strong thin wall, is entirely closed at one end and has at its other end an integral flange 2. The shell rests on its side, but is so supported, in a manner not shown, as to incline slightly toward its flanged end. Shrunk over the shell 1 so as to tightly grip it and bearing against its flange 2 is a thick rigid ring 3. After this ring has been shrunk on, an inlet connection 4 is secured to the top of the shell near its closed end, an outlet connection 5 is secured to the bottom of the shell near its flanged end and a gage connection 6 is secured to the top of the shell nearly midway between its ends. A pipe 7 leads, mediately or immediately, from a still or compressor not shown to the connection 4. A pipe 8 may lead from the connection 5 to an expansion valve not shown, either directly or through a receiver. In case the gas, such as ammonia, is liquefied as a result of its condensation, the inner part of the connection 5 has a horizontal passage 9 so that the liquid may entirely drain off from the shell 1. Connecting with the shell 1 by the connection 6 is a high pressure gage 10, to indicate the pressure of the gas being condensed. Outside of the flange 2 is another rigid ring 11, considerably thinner than the ring 3, having the same outside diameter as the flange 2 and its other ring, but having a somewhat larger inner diameter. Resting against the flange 2 in the step thus formed is a lead gasket 12. Stud bolts 13, say sixteen in number, having plane intermediate sections 14 of greater diameter than their threaded ends, are screwed through bolt holes in the ring 11, the flange 2 and the ring 3, so as to permanently hold together in rigid form these three parts, the sections 14 bearing against the ring 11 and the ring being calked around the bolts 13 so as to hold permanently. A head 15, preferably of cast or drop forged steel, has an inner rim just sufficient to fit inside the open end of the shell 1 and within the gasket 12, then has an intermediate step just sufficient to fit within the ring 11 so as to compress the gasket 12 and then has an outside flange of the same diameter as the ring 11 and provided with bolt holes which fit over the sections 14. Nuts 16 firmly hold the head 15 in place and make a gas tight joint. The inside of the head 15 is cross sectioned by ribs 17, as best shown in Fig. 8, the ribs being higher toward the center, as best shown in Figs. 2 and 5. This construction makes a strong rigid head and permits its being dish shaped on the outside, within its outer flange, as shown in Fig. 5, thus lessening the weight of metal. Within the ribs 17 are a number of round openings 18 through the head, which in this particular head chosen for illustration number twelve, each opening at its inside end being surrounded by an annular tongue and recess 19, as shown in Fig. 2. These openings are so arranged that two are near the bottom in one plane, that four are above these two in another plane, that four more are above the former four in another plane, and that two more are above the higher four in another plane. Before, however, the head 15 is bolted into place, the interior condenser piping is arranged and connected as follows: Lead gaskets 20 are placed in the recesses 19. One return bend pipe 21, having welded around each of its free ends, near their termination, an annular tongue and recess 22 registering with the corresponding recess and tongue in the head, is passed through the lowest pair of openings 18 so as to compress, by means of their tongues, the adjacent gaskets 20. The lengths of the pipe 21 and of the similar pipes subsequently described are such that when the head 15 is bolted into place the return bend parts of the pipes almost reach to the inner closed end of the shell 1, as shown in Fig. 5. A pair of lesser couplings 23 may be outwardly cylindrical and they have slightly flanged cylindrical heads respectively abutting against the inside of the perforated partitions of their corresponding outwardly hexagonal larger couplings 24.

The couplings 23 and 24 are best shown in Fig. 2 in section and in Fig. 5 in elevation. The inner end of each coupling 23 is internally threaded. These couplings are screwed around the outwardly threaded and projecting ends of the pipe 21 so as to still more compress the gaskets 20 and thus to make gas tight joints. The outer end of each coupling 23 is unthreaded and has the same internal diameter as the pipe 21, as shown in Fig. 2. A second return bend pipe 25, having similar annular tongues and recesses 26 is passed through the front pair of the lower four openings 18, similarly compressing the adjacent gaskets. A pair of similar lesser couplings and a pair of similar larger couplings 27 are similarly positioned so as to make a gas tight joint at these latter openings. With a similar result a third return bend pipe 28, having similar annular tongues 29, is passed through the back pair of the lower four openings 18, similarly compressing adjacent gaskets; and a pair of similar lesser couplings and a pair of similar larger couplings 30 are similarly positioned. With a similar result a fourth return bend pipe 31, having similar annular tongues 32, is passed through the front pair of the upper four openings 18, similarly compressing adjacent gaskets; and a pair of similar lesser couplings and a pair of similar larger couplings 33 are similarly positioned. With a similar result a fifth return bend pipe 34, having similar annular tongues 35 is passed through the back pair of the upper four openings 18, similarly compressing adjacent gaskets; and a pair of similar lesser couplings and a pair of larger couplings 36 are similarly positioned. And with a similar result a sixth return bend pipe 37, having similar annular tongues 38, is passed through the uppermost pair of openings, similarly compressing adjacent gaskets; and a pair of similar lesser couplings and a pair of larger couplings 39 are similarly positioned. When these various return bend pipes 21, 25, 28, 31, 34 and 37 and their outside couplings are in position and the head 15 is bolted on, the appearance of the parts is as best shown in Fig. 5. The advantage of this mode of connection, as especially compared with permanently welding the pipe ends into the head, is that the pipes are removable in case repairs are necessary. For convenience of cleaning, the internal diameters of the pipes should not be less than one inch; and in the larger condensers, the sizes range up to two inches.

All the couplings 24, 27, 30, 33, 36 and 39 are internally threaded as far as the heads of their corresponding contained lesser couplings. Excluding for the present the back members of the couplings 24 and 39, the front members of the couplings 24 and 39 and each member of the couplings 27, 30, 33 and 36 have screwed into them union T's 40, of standard type, having square nut plugs 41 screwed into the end openings of the T's. A nipple 42 connects the side openings in the T's of the front members of the couplings 24 and 27. A nipple 43 similarly connects the T's of the back members of the couplings 27 and of the front member of the couplings 30. A nipple 44 similarly connects the T's of the back members of the couplings 30 and 36. A nipple 45 similarly connects the T's of the front member of the couplings 36 and of the back member of the couplings 33. A nipple 46 similarly connects the T's of the front members of the couplings 33 and 39. All the inter-pipe connections have the same internal diameters as their connected pipes. In assembling the parts, two T's are first connected by a nipple, then a larger coupling containing a lesser coupling is screwed on to each T and then the two lesser couplings are screwed on to their pipe ends.

It will be observed that this construction provides a continuous passage upward from the outer end of the back member of the pipe 21 in order through the pipes 21, 25, 28, 31, 34 and 37 to the outer end of the back member of the pipe 37; that this entire system of piping has a wall in common with the gas chamber formed by the shell 1 and the head 15; and that the inlet end of the system is near the outlet connection 5. Instead of making the shell 1 of steel, as has been suggested, it would be better, in case a small number of return bend pipes are used, say two, to make the shell out of a long lap welded wrought iron pipe. A shell of such material would be well adapted for attachment to a side wall. But for a condenser to be positioned over a refrigerator, as is especially intended, the strong light steel shell is preferable.

Screwed into the back member of the couplings 39 is a horizontal intermediate pipe connection 47, having at its outer end a six bolt hole male flange and having through the upper part of the flange a vertical semi-cylindrical recess 48 with a semi-annular enlargement 49 at its lower end within the connection, as shown in Fig 10. The connection 47 also has in front, integral with itself, a bracket arm 50 having a vertical bolt recess. Bolted to the flange of the connection 47 is a water outlet 51, having a corresponding female flange, and having side and end openings similar to those of the T's 40, the end opening being provided with another one of the square nut plugs 41. Through the upper part of the flange of the outlet 51 is a vertical semi-cylindrical recess 52, registering with the recess 48 and having a semi-annular enlargement 53 at its lower end registering with the enlargement 49. A thin gasket 54 makes a water tight joint between the connection 47 and the outlet 51. On the upper side of the outlet 51, between its flange and side opening, is a perforated hub 56, slanting outward and having in upper end a threaded enlargement. Screwed into this enlargement is a mercury well 57 containing a quantity of mercury 58. A plug 59 screws into the top of the well and usually closes it. The well 57 projects so far into the outlet 51 and the height of the mercury 58 is such that the temperature of the mercury varies uniformly with the temperature of the water outflowing from the side opening of the outlet. Screwed into the back member of the coupling 24 is a water inlet 60, having in its outer end opening another one of the square nut plugs 41, having its inner end and its side opening like those of the T's 40, but having on top a hub like the hub 56 and containing another mercury well 61 with its plug 62. The well 61, similar to the well 57, projects so far into the inlet 60 and the height of its contained mercury is such that the temperature of the mercury varies uniformly with the temperature of the water inflowing from the side opening of the inlet.

In connection with our shell type condenser, as thus described, we employ our quick motion controller constructed as follows: A lower casing 63 has a depressed circumferential flange from which in back proceeds upward an arm 64, having a horizontal bolt recess and ending in a pivot support. The inner part of the casing 63 on top forms a shallow chamber and contains as parts integral with the chamber four stoppers 65, spaced away a little from the vertical center of the chamber in circular formation and with vertical slits between themselves, so as to form a broken ring at the top in the same plane as the top of the casing inside its flange. The under side of the casing 63 has a conduit projection 66 extending downward with an axial passage extending from between the stoppers 65 to the bottom of the projection, where it is enlarged and threaded. For purposes of strength, four ribs 67 extend radially from the projection 66 to the inside of the flange of the casing. Integral with the projection 66 and extending horizontally backward is a cylindrical hub 68 of a certain diameter right near the projection and of a reduced diameter for the remainder of its length. In the face thus formed in the larger diameter of the hub 68 is an annular groove containing a lead gasket 69. A small passage 70 extends, along a line to the left of the center, from the outer end of the hub 68 to the passage in the projection 66. Intercepting the passage 70 is a slightly conical opening through the hub 68 that has a cylindrical threaded enlargement to the right of the hub. In the conical part of this opening is a plug valve 71, having a transverse passage adapted to register with the passage 70 and being of reduced diameter at its outer end to the right, so that it can be held in place by a lead gasket 72 and a slotted ring 73, which latter is screwed into the threaded enlargement of the opening. The outer end of the valve 71 within the ring 73 also has a transverse slot so that it can be opened or closed by means of a small screw driver. No part of the valve 71 or of the ring 73 extends as far as the cylindrical surface of the hub 68. This cylindrical surface, where the hub is of reduced diameter, is threaded. Screwed around the threaded surface of the hub 68 so as to inclose the valve 71 and the ring 73 and so as to compress the gasket 69, there forming a gas tight joint, is an internally threaded cap 74, having a square nut on its outer end.

Into the enlarged and threaded lower end the passage of the projection 66 is screwed the vertical end of an L shaped tube 75, entirely closed at its long horizontal end, threaded for some distance at its top and having an integral collar 76 adapted to occupy the enlargements 49 and 53 and so near the elbow of the tube that, when its collar occupies these enlargements, the horizontal part of the tube will be near the axial centers of the pipe 37, the coupling 39 and the connection 47, as shown in Figs. 2, 9 and 16. A nut 77 is, however, threaded over the upper end of the tube 75 before it is screwed into the projection 66. And as the connection between the tube and the projection is to be permanent, it is made with litharge and glycerin.

Upon the edge of the top of the casing 63 within its depressed circumference rests a lead gasket 78. Upon the gasket 78 rests the circumference of an imperforate diaphragm 79, slightly corrugated between the gasket and a circle in line with a continuation of the outside lines of the stoppers 65. Preferably the diaphragm is made of cold rolled steel six one-thousandths of an inch thick; and is then corrugated and hardened so as to be resilient. When in its depressed position, as shown in Figs. 18 and 19, the diaphragm 79 rests upon the stoppers 65; and the thickness of the gasket 78 is so chosen as to properly limit the down movement of the diaphragm. Above the diaphragm 79 is a rigid annular limiting piece 80, near its circumference resting on the diaphragm and spaced more and more away therefrom toward its own annular center. This piece is corrugated so as to register with the corrugations of the diaphragm 79 and has through it quite a number of small escape holes; so that, whenever the diaphragm is forced upward, any fluid between the diaphragm and the piece can pass through the holes. In practice the piece 80 is so formed and spaced as to permit of a total movement of the diaphragm 79 at its center of about one-eighth of an inch. Over and around the circumference of the piece 80 is placed another gasket 81, similar to the gasket 78.

A foot 82 has, inside the circular opening in the piece 80 and resting upon the part of the diaphragm 79 within the corrugated part, a flanged extension with a flat under surface. About midway between the vertical extremities of the foot 82 is a rectangular opening extending through the foot from back to front. Free to reciprocate slightly in this opening is a rectangular slide block 83, having through it from side to side, in a direction transverse to that of the opening in the foot 82, a partially cylindrical opening containing the free end of an inner lever 84. The opening through the block 83 slightly exceeds half a circle, so that, after the block and the outer end of the lever 84 have been inserted into the opening in the foot 82, the lever cannot be withdrawn from the block but causes it to reciprocate slightly as the lever is correspondingly rotated. The inner end of the lever 84 has a shaft opening and a key way containing a key 85. At its top the foot 82 has a central hub of reduced diameter. Outside of the hub thus formed and resting on the foot 82 is a heavy helical compression spring 86, called the outward opposing spring. At its top the spring 86 abuts against the similar seat of a head 87, having on top a concave recess.

An upper casing 88 fits over the head 87, the spring 86, the lever 84 and the key 85, surrounds and guides the cylindrical part of the foot 82, presses down the gasket 81 and is secured to the casing 63 by eight hexagonal headed bolts 89, which pass through threaded holes in the upper and lower casings made for that purpose. The casing 88 has an extension at one side to contain the lever 84 and the key 85 and has a horizontal shaft opening with an outside threaded stuffing box recess. Inserted through this opening in the casing 88 and at its inner end journaled in the casing, passing through the opening in the lever 84 and having a key way registering with the key 85 so as to firmly lock the lever, is a rock shaft 90, having a key way also at its outside end and also a transverse pin opening. In the recess around the outer end of the shaft 90 is a packing 91, held in place by a gland nut 92. The nut 92 is screwed in rather loosely as its purpose is to prevent a rapid escape of ammonia in case the diaphragm 79 breaks. In the axial center of the top of the casing 88 is a threaded opening, through which a quantity of non-rusting lubricant should be poured so as to be above the block 83. Through this opening in the top of the casing 88 passes an adjusting screw 93, slotted at its exterior top so that it can be turned by a screw driver, and having a convex lower end resting in the concave recess of the head 87. Around the outside of the top of the casing 88 is an annular recess containing a lead gasket 94. Fitting over the top of the casing 88 and the screw 93 and threaded on to the top of the casing so as to compress the gasket 94 is a cap 95, having a hexagonal nut at its top.

Cast integral with the casing 88 is a one rod support 96 and a two rod support 97. Secured to the outside end of the shaft 90 by a key 98 in the outside key way of the shaft and by a pin 99 in the pin opening in the shaft is a vertical lever 100, having on one side a cam face 101 and having a slotted pivot fork at its top. A double end cam device has an annular forward cam 102 with its face toward the support 96 and a similar annular back cam 103 with its face toward the support 97 and has the two cams connected on their under sides by an integral horizontal bar 104. A pivot 105 passes through the bar 104 at its end near the cam 102 and rests in the slots of the fork of the lever 100. A forward sleeve head 106 has an annular head toward the cam 102 and an integral sleeve toward the cam 103. A back sleeve head 107 has an annular head toward the cam 103 and an integral sleeve toward the cam 102. A comparatively light helical compression motor spring 108 surrounds the sleeves of the sleeve heads 106 and 107, which are some distance apart, and bears against their heads. An actuating rod 109, having a little over a fourth of its length of a certain diameter and the remainder of its length of a less diameter, has its part of reduced diameter inserted through the sleeve head 106, the spring 108, the sleeve head 107 and the cam 103, has its part of larger diameter adapted for reciprocation in the cam 102 and near its forward end resting in a semi-cylindrical reciprocating recess at the top of the support 96, and has between the support 96 and the cam 102 an integral collar 110. A sleeve piece 111 is slid over and surrounds the part of the rod 109 of reduced diameter for part of such length of reduced diameter, is adapted for reciprocating in the cam 103, has between the cam 103 and the support 97 an integral collar 112, near its back end rests in a semi-cylindrical reciprocating recess at the top of the support 97, is threaded around its back end, has a solid back end and is secured to the rod 109 by its solid back end and by a pin 113 which passes through the back end of the contained rod. A semi-cylindrical cap piece 114 makes a reciprocating fit over the rod 109 and is screwed to the top of the support 96. A similar semi-cylindrical cap piece 115 makes a reciprocating fit over the piece 111 and is screwed to the top of the support 97.

Centrally pivoted at the top of the arm 64 is a lever 116, having a contact face at its top away from and in substantial alinement with the piece 111 and having a longitudinally slotted fork at its lower end. A curved arm 117 has an internally threaded hub at its top threaded around the threaded part of the piece 111, is kept in longitudinal position by a forward lock nut 118 and a back lock nut 119 and is secured to the lower end of the lever 116 by a pin 120 passing through the slots in the lever forks.

Cast integral with the casing 88 and projecting to the right from near its top is a pivot support 121. Pivoted to the support 121 by a pin 122 is a horizontal forward arm 123 and a horizontal back arm 124. The arm 123 has a forward knuckle 125 inclined so as to be lifted by the cam 102 on a forward movement of the cam, and it has at its free end a forward catch 126, adapted to engage with the forward side of the collar 110, when the cam 102 is in its extreme back position, in such a way as to lock the collar. But when the cam 102 advances and lifts the knuckle 125 sufficiently, the catch 126 is also lifted, releasing the collar 110, and rests on the collar. Similarly the arm 124 has a back knuckle 127 inclined so as to be lifted by the cam 103 on a back movement of the cam; and it has at its free end a back catch 128, adapted to engage with the collar 112, when the cam 103 is in its extreme forward position, in such a way as to lock the collar. But when the cam 103 recedes and lifts the knuckle 127 sufficiently, the catch 128 is also lifted, releasing the collar 112, and rests on the collar. A light double end flat spring 129, secured at its middle by a screw 130 to the support 121, tends to depress the arms 123 and 124.

Bearing against the face 101 is the head of a bolt 131, which at its opposite end is of reduced diameter and threaded. Abutting at one end against the inside of the head of the bolt 131 is a helical compression spring 132, called the inward opposing spring; at its other end the spring abuts against the outside of the head of a headed sleeve 133, surrounding the bolt 131, threaded on the outside of its part of lesser diameter and screwed into a threaded opening in the support 97 in axial alinement with the face 101. The thrust of the spring 132 is regulated by turning the sleeve 133 in the support 97 so as to advance toward or to recede from the head of the bolt 131. The spring 132 is lighter than the spring 86. The sleeve 133 is held in any desired position by a lock nut 134 screwed around the sleeve on the outside of the support 97. The bolt 131 is free to reciprocate in the sleeve 133, increasing or diminishing the thrust of the spring 132 in so doing; but is held from going too far toward the face 101 by lock nuts 135 and 136 threaded on to the threaded end of the bolt. The bolt 131 is adjusted, by means of the nuts 135 and 136, so that its head bears against the face 101 all the time that the lever 100 is in positions corresponding to positions of the diaphragm 79 between its extreme low position and an approximate midway position; but so that its head is back and out of contact with the face all the time that the lever is in positions corresponding to positions of the diaphragm between its approximate midway position and its extreme high position. After the potential thrust or compression of the spring 132 has been adjusted by turning the sleeve 133 forward or back, the bolt 131 is adjusted as stated. A thin metal cover 137 is placed over the moving parts outside of the casing 88, has a vertical slit so that it can slide over the parts around the small end of the rod 109 and is secured within a step around the bottom of the casing by small screws 138.

For the thermostatic actuation of the diaphragm 79 various expansive fluids may be employed. But we prefer to use anhydrous ammonia. This is introduced before the controller is attached to the condenser. To charge the tube 75, the cap 74 is removed, the valve 71 is opened and a charging vessel is secured by a threaded connection to the hub 68. Such a vessel should contain just sufficient liquid ammonia to fill the tube 75, when in the position shown in Fig. 18, up to the collar 76. After the charge has been introduced the valve 71 is closed and the charging vessel is disconnected. By then placing the controller so that the passage 70 is vertical, the valve 71 can be used as a purge valve to expel the air remaining in the tube 71, the loss of ammonia being inconsequential. The valve 71 is then closed, the ring 73 is tightened and the cap 74 is firmly screwed over the hub 68 so as to compress the gasket 69.

After passing the tube 75 into the connection 47, the back members of the couplings 39 and the pipe 37, the controller is quite firmly secured in place by the position of the collar 76 in the enlargements 49 and 53, by the clamping of bolts 139 upon the flanges of the connection 47 and the outlet 51 and by the tightening of the nut 77 on the outer edges of these flanges. But additional firmness is secured by a bolt 140 threaded into openings in the front parts of the casings 63 and 88, between the gaskets 78 and 81 and the outer edges of the casings, held in place in the casings by a lock nut 141 bearing against the under side of the casing 63, occupying near its lower end the recess in the arm 50 and held in place in the arm by lock nuts 142 and 143, respectively, above and below the recess.

For controlling the flow of condensing water, instead of an ordinary unbalanced valve, we employ a balanced valve and preferably the valve shown and described in the application of Roehrich, filed June 2, 1910, Ser. No. 564,580, entitled Balanced water valve. This valve is constructed as follows: A casing 144 has a cylindrical inlet chamber 145 of lesser diameter, a cylindrical outlet chamber 146 of greater diameter adjacent to said former chamber and concentric with it, a narrow rimlike valve seat 147 projecting from the casing wall at the end of the inlet chamber into the outlet chamber, an inlet passage 148 leading from beneath upward into the inlet chamber and internally threaded at its lower end, and an outlet passage 149. parallel with the inlet passage, leading from the outlet chamber and threaded at its lower end. Cast integral with the casing 144 on its under side is a supporting bracket 150, extending frontward and having in it a threaded recess. The casing 144 has in front an annular diaphragm recess 151, internally threaded at its front end; and, in the rear, at the back of the chamber 146, the casing is open and internally threaded.

Within the chamber 146 is a valve disk 152 axially perforated and threaded in its side toward the seat 147, having a hub on its side away from the seat, through part of which the perforation continues, of hexagonal form on the outside for part of its length and ending in a short reciprocating rod of small diameter. The disk 152 toward the seat 147 also has a rim of a little greater diameter than the seat, so as to contain a leather disk 153 adapted for seating on being pressed upon the seat. Passing through the disk 153 and screwed into the perforation of the disk 152 is the screw end of a spacing piece 154 having a clamping washer 155, within the chamber 145 and of a little less diameter than that chamber, that firmly holds the disk 153 against the disk 152. The piece 154 also has a diaphragm washer 156 toward the other end of its containing chamber, is of hexagonal form between the washers 155 and 156 and has a threaded perforation from its end toward the recess. Seated in the recess 151 is a diaphragm 157, preferably of rubber, although it may be of copper, if very thin. Passing through the diaphragm 157 and screwed into the perforation of the piece 154 is the threaded end of a motor rod 158 having a washer 159 just outside the diaphragm 157 so as to firmly compress the diaphragm between itself and the washer 156 when the rod is screwed into place and thus to make a water tight joint.

Screwed into the recess 151 so as to compress the diaphragm 157 and thus to make a water tight joint is an end piece 160, having a hexagonal outer section, having an axial perforation through which the rod 158 can freely reciprocate, having an outside threaded recess internally threaded and having a rim around the outside of the perforation. A helical closing spring 161, surrounds the rod 158 and at one end abuts against the piece 160 around its rimmed perforation. The rod 158 is threaded from its outer end nearly as far as the part which reciprocates through the perforation in the piece 160. Threaded on to the rod at a little distance from its outer end is a milled adjusting nut 162, bearing against the outer end of the spring 161 for compressing it as much as may be desired and having an inner unmilled part of much less diameter and fitting inside the spring. A lock nut 163 holds the nut 162 in place. Screwed into the recess of the piece 160 is a sleeve 164 for protecting the rod 158, the spring 161 and the nut 162. Threaded on to the extreme outer end of the rod 158 is a milled motor head 165. Screwed into the casing 144 and forming the end of the chamber 146 is a head 166, compressing any kind of water tight gasket 167 at the end of the casing and having a hexagonal nut formed on its outer end. At the center of the inside of the head 166 and cast integral therewith is a guide spider 168 in which is the rod end of the disk 152. The spider permits of a reciprocating fit of the rod end and there is enough free space on the inside of the head 166 for the disk 152 to reciprocate sufficiently to open the valve. The open spaces between the arms of the spider 168 prevent the accumulation of sediment in the head 166.

Screwed into the bracket 150 is a bolt 169, which at its other end fits into the recess of the arm 64 and is held in place by nuts 170 and 171 respectively in front and in back of the arm. Thus supported the water valve is in such position that the head is always in contact with the face of the lever 116.

A water supply pipe 172, from any source of cool water supply, is threaded into the passage 148. A connecting pipe 173 leads from the passage 149 into the side opening of the inlet 60. A discharge pipe 174 leads from the side opening of the outlet 51. It is assumed that a hand valve is located somewhere in advance of the pipe 172 to determine the maximum flow through the water conduits.

The method of operation is as follows: Assume that the apparatus is used to condense ammonia and that ammonia has just ceased entering through the pipe 7. The flow of water, entering the pipe 172, continues through the passage 148, the chamber 145, the seat 147, the chamber 146, the passage 149, the pipe 173, the inlet 60, the back members of the couplings 24 and 23, the pipes and intermediate connections before described beginning with the back member of the pipe 21 and ending with the back member of the pipe 37, the back member of the lesser couplings connected to the pipe 37, the back member of the couplings 39, the connection 47 and the outlet 51, and emerges from the pipe 174. In its course, with the ammonia on the outside of the return bend pipes in the shell 1, heat has been abstracted from the ammonia, so as to cool and liquefy it, and has been taken up by the flowing water. Then as the water has been passing out of the shell 1 it has given up a portion of its heat to the tube 75 and its contained ammonia. As the radiation through the diaphragm 79, and the intermediate walls of the parts down as far as the collar 76, is slight; and as the loss of heat is compensated for by heat coming from the liquid ammonia in the horizontal part of the tube 75, the pressure of the ammonia vapor on the under side of the diaphragm 79 depends on the temperature of this liquid ammonia. The pressures of ammonia vapor corresponding to given temperatures are stated in the well known ammonia tables. But now as the inflow of heated ammonia gas has ceased, the heat of the outflowing water is becoming less. Accordingly, not merely is no heat passing into the liquid ammonia in the tube 75, but also heat is passing from that ammonia into the outflowing water. Consequently the pressure on the under side of the diaphragm 79 is diminishing. Thereupon the outward opposing spring 86 begins to thrust the foot 82 downward so as to depress the diaphragm 79 downward from its extreme high position toward the position shown in Figs. 18 and 19. Naturally the thrust of the spring 86 becomes weaker the more the diaphragm 79 is depressed. As the foot 82 is forced downward, the block 83 and the outer end of the lever 84 are also depressed. This movement of the lever 84 rotates backward the shaft 90 and through it the lever 100. When the lever 100 has been rotated backward to a point approximately corresponding to the midway position of the diaphragm 79 between its extreme high and low position, the face 101 begins to bear against the head of the bolt 131 so as to compress the inward opposing spring 132. Naturally such compression becomes more intense as the lever 100 approaches the extreme back position. This backward rotation of the lever 100 also carries the pin 105 backward so as to carry backward the bar 104 and the cams 102 and 103. The parts are now in the positions best shown in Figs. 16 and 17. The catch 126 is now resting on the collar 110; the catch 28 is locking the collar 112; and the cam 103 is bearing against the knuckle 127. Finally the temperature of the gas or vapor in the shell 1 reaches a predetermined low limit. The temperature of the outflowing water and of the liquid ammonia in the tube 75 has fallen correspondingly; and the outward opposing spring 86 has thrust the foot 82 and the diaphragm 79 downward to or nearly to their lowest possible position. At this same instant the cam 103 has been carried so far back along the incline of the knuckle 127 that, at a critical point in the incline, the arm 124 flies up and the catch 128 releases the collar 112. Thereupon the spring 108, which meanwhile has been in process of compression by the backward movement of the cam 102 against the sleeve head 106, suddenly forces the sleeve head 107 against the cam 103 and carries the rod 109, the piece 111, the collars 110 and 112 and the arm 117 an equal distance backward. The backward movement of the arm 117 carries frontward the contact face of the lever 116 so as to release the head 165. Thereupon the spring 161, acting upon the nut 162, forces the rod 158 outward so as to seat the disks 152 and 153 and thus to stop the flow of water through the condenser. With the back movement of the rod 109 and the piece 111, the arm 123, forced down by the spring 129 and by gravity, by means of the catch 126 locks the collar 110 and has its knuckle 125 resting on and in front of the cam 102. At the same time the catch 128 rests on the collar 112 and the knuckle 127 is above and out of contact with the cam 103. All parts are now at rest and so continue until the temperature of the ammonia in the condenser rises to a predetermined high limit.

It is to be noted that in this inward half of the cycle of operation the thrust of the spring 86 overcomes the counter thrust of the weaker spring 132 because of the diminishing pressure of the vapor on the under side of the diaphragm 79; that the spring 86 simply supplies force to compress the spring 132; that the critical limit at which the rod 109 and the piece 111 spring back is determined solely by the intensity of the compression of the spring 132; and that the extent of such compression is regulated so that the spring back of the rod and the piece shall occur when the temperature of the gas or vapor in the shell 1 reaches its predetermined low temperature limit. To lower the temperature limit at which the spring back shall occur, the potential compression of the spring 132 is lessened; and to raise such limit, such potential compression is increased. A turning of the sleeve 133 backward tends to relieve the spring 132; and a turning of the sleeve frontward increases the compression of the spring.

Now assume that the temperature of the ammonia in the condenser begins to rise toward a predetermined high limit in consequence of hot gas entering through the pipe 7 from a still or compressor. Heat now passes through the back member of the pipe 37, through the water standing in the pipe and through the tube 75 into the liquid ammonia contained in the tube. The pressure of the ammonia vapor on the under side of the diaphragm 79, assisted by the inward opposing spring 132, begins to force the foot 82 and the outward opposing spring 86 toward their extreme high position. Consequently the block 83 and the outer end of the lever 84 are correspondingly lifted. This movement of the lever 84 rotates frontward the shaft 90 and through it the lever 100. This frontward rotation of the lever 100 causes its face 101 to advance away from the head of the bolt 131 so as to allow the spring 132 to expand. When the lever 100 has rotated frontward to a point approximately corresponding to the midway position of the diaphragm 79, the bolt 131 no longer follows the face 101, being held back by the adjustment of the sleeve 133. Consequently the spring 132 is not a factor in determining or in regulating the high temperature operating limit. But the frontward rotation of the lever 100, both before and after the face 101 leaves the bolt 131, carries the pin 105 frontward so as to carry frontward the bar 104 and the cams 102 and 103. Now suddenly, the cam 102 being at the critical point on the incline of the knuckle 125, the arm 123 flies up and the catch 126 releases the collar 110. Thereupon the spring 108, which meanwhile has been in process of compression by the frontward movement of the cam 103 against the sleeve head 107, suddenly forces the sleeve head 106 against the part of the rod 109 of larger diameter and carries the rod, the piece 111, the collars 110 and 112 and the arm 117 to their extreme front position. The frontward movement of the arm 117 carries backward the contact face of the lever 116 so as to force the head 165 inward and to compress the spring 161. This inward movement of the head 165 forces the rod 158 inward so as to unseat the disks 152 and 153 and thus to renew the flow of water through the condenser. With the front movement of the rod 109 and the piece 111, the arm 124, forced down by the spring 129 and by gravity, by means of the catch 128 locks the collar 112 and has its knuckle 127 resting on and in back of the cam 103. At the same time the catch 126 rests on the collar 110 and the knuckle 125 is above and out of contact with the cam 102. The cycle of operation is now complete.

It is to be noted that in this outward half of the cycle of operation the maximum compression of the spring 86 alone determined the critical limit at which the rod 109 and the piece 111 spring forward; and that the extent of such compression is regulated so that the spring forward of the rod and the piece shall occur when the temperature of the gas or vapor in the shell 1 reaches a predetermined high limit. To raise the temperature limit at which the spring forward shall occur, the potential compression of the spring 86 is increased; and to lower such limit, such potential compression is lessened. Obviously a turning of the screw 93 downward, after the cap 95 has been temporarily removed, increases the compression of the spring 86; and a turning of the screw upward tends to relieve the spring. The spring 132 is adjusted after the adjustment of the spring 86 has been made.

In practice the predetermined high temperature limit in the condenser, at which the flow of water begins, is usually taken at 95° F., corresponding to a saturated ammonia vapor pressure of 198 lbs.: and the corresponding predetermined low temperature limit, at which the flow ceases, is usually taken at 80° or 75°, corresponding to pressures of 154 and 141 lbs., respectively. While the ammonia is saturated, the pressures and the corresponding temperatures can be ascertained by the gage 10 and the ammonia tables. But if the incoming gas is superheated the gage would not give a correct basis for ascertaining the temperature. But by temporarily removing the plug 59 and inserting a thermometer, such as are used in refrigeration practice, into the mercury 58, the temperature of the surrounding water and of the ammonia in the condenser can be ascertained directly under all conditions of operation. So by inserting a thermometer in the well 61, after the plug 62 has been temporarily removed, the difference in temperature between the incoming and the outflowing water can be ascertained so as to measure the efficiency of the condenser.

It may be thought that the spring 132 might be dispensed with; and that an accurate adjustment could be made by means of the spring 86, so as to give the desired frontward and backward movements of the rod 109 and the piece 111. But such is not the fact. A single spring, such as the spring 86, can be compressed so that at one certain point it will have a certain thrusting force. But it is well nigh impossible to regulate such a spring so that it will have two predetermined thrusting forces at two points of its compression. Conditions vary with different springs that are apparently alike. Furthermore, with only one spring such as 86, there would be no means of varying the stopping limit, say from 80° to 75°. But by using the additional inward opposing spring 132, the stopping limit can be varied at will. It is also quite essential to the satisfactory operation of our own condenser that the water valve be balanced, that is to say that the tendencies of the pressure of the incoming water supply in the chamber 145 to seat and to unseat the disks 152 and 153 shall be approximately equal. For if it were otherwise, since water pressures in the same supply pipe vary at different times, the force resisting the actions of the springs 86 and 132 and the vapor on the under side of the diaphragm 79 would correspondingly vary and the high and low temperature starting and stopping limits would be altered. This desired balanced condition exists in the Roehrich valve shown and described because the chamber 145 is of practically uniform diameter, so that the pressure effect of the water supply in this chamber on the washer 155 and the disk 153 at all times approximately equals the pressure effect of the water supply on the washer 156 and the diaphragm 157. Hence the force necessary to open the valve is approximately only such as is necessary to compress the spring 161. Any excess pressure of the water supply tending to open the valve would be counteracted by the spring 161. The quickness of the closing of the valve depends on the thrusting force of the spring 161 and that force is regulated by screwing the nut 162 inward or outward. It is also to be noted that in opening and closing the water valve the controller exerts a quickness of action that is comparable to that of an electric device, without, however, having any of the disadvantages that are attendant upon the use of electro magnets and solenoids.

The low limit for stopping the flow of condensing water should be placed just a little above the temperature that could be produced in the condenser, while no gas is entering through the pipe 7, with a free flow of water in the warmest weather. Thus if the condensing water is so warm in summer that it can cool the liquid and vaporous ammonia down only to 78° when the condenser is not receiving gas, it would be folly to fix a low limit of 75°. For with such an unattainable low limit the water would be flowing all the time. Under the conditions supposed, 80° would be a suitable low limit. On the other hand, if the high limit is fixed at 95°, for instance, and if the temperature outside the condenser rises above that point, the only effect is that the ammonia is occasionally cooled by a brief flow of condensing water while no heated gas is being received through the pipe 7. Obviously such a pre-cooling of the liquid ammonia before it passes to the expansion valve is an advantage, rather than otherwise.

The quantity and coolness of the condensing water may be in such relation to the quantity of hot gas, entering through the pipe 7, that the flow of water continues all through each period during which gas is being forced through the pipe 7 by the still or compressor at its unshown end. Or such quantity and coolness may be such as to cause the predetermined low limit to occur one or more times in each period. But it is quite immaterial which way of operation takes place.

After any condenser has been in use for a time, scale accumulates on the inside of the water pipes and retains air from the water, to such an extent as to interfere seriously with the transmission of heat through the pipe walls. By stopping the flow of water and temporarily removing the plugs 41, such scale can be scraped off by means of a wire brush. If a cylindrical brush is used for the back members of the pipes 21 and 37, the wells 61 and 57 may have to be temporarily unscrewed. But this is not necessary if a crescent shaped brush is employed.

When the pipes are clean, by inserting thermometers in the wells 61 and 57 while the pipe 7 is delivering hot gas, a definite difference of temperature between the incoming and the outgoing water may be noted. Then if subsequently, with a similar temperature of the incoming water, a materially lower temperature of the outgoing water, while the pipe 7 is also delivering hot gas, is observed; it is apparent that the condenser is not operating as efficiently as formerly and that scale must have accumulated in the pipes. Thus is afforded a ready means of determining the condition of the condenser in reference to the presence of scale without unscrewing the plugs 41. This construction, therefore, has an advantage over the construction next to be considered.

For now considering Fig. 27: Here all the parts that are the same in the preceding figures are designated by the same numerals and need no further description. The return bend pipe 39 in the shell 1 is one of an indefinite number. But instead of the horizontal part of a tube 75 being in the back member of the pipe, there is the horizontal part of a similar tube 75$^a$, having an integral annular gland nut 175 so that the tube 75$^a$ is inserted through a head 15$^a$ and the nut compresses a gasket 176 in a stuffing box recess in the head. By this construction the tube 75$^a$ projects directly into the shell 1; and it receives heat directly from the ammonia in the still and transmits heat directly to such ammonia. Therefore, in this construction also the diaphragm 79 is thermostatically actuated. An outlet 51$^a$ is secured directly to the back member of the larger couplings 39. This construction, as compared with the former, is more simple; but it affords no means of ascertaining the presence of scale without removing the plugs 41.

Finally considering Fig. 28: Here all the parts are precisely the same as in the preceding figure except in two particulars. A tube 75$^b$ takes the place of the tube 75$^a$ and is cut off a short distance beyond its gland nut 175 so that the ammonia in the shell 1 is free to pass into the tube and to press against the diaphragm 79. Consequently the vertical part of the tube is devoid of any charging device and passes up directly into a casing 63$^b$, which is like the former casing 63 except that it has no downward projection 66. Therefore in this construction the diaphragm 79 is directly acted upon by the pressure of the vapor or gas in the shell 1 as registered by the gage 10. This construction is more simple than either of the former two. But it has the same disadvantages as the construction of Fig. 27. Furthermore it has its own peculiar disadvantage. For as the ammonia that is expelled from a still or compressor is highly superheated and as the superheat must be first removed before liquefaction can occur, a pressure actuated device is not correctly responsive to the requirements of the problem. Therefore to automatically control the flow and stoppage of condensing water it is far preferable that the condition of the kinetic energy of the gas particles in the condenser be manifested by a thermostatic device, as in the first two constructions, rather than by the pressure device of the last figure. Furthermore in the construction of Fig. 28, in case the diaphragm 79 breaks, the entire ammonia charge is liable to escape unless prevented by the packing 91 and gland nut 92.

Mechanism similar to that illustrated by the parts referred to by the numerals 75 to 120 inclusive, with the description relating thereto, is made the subject of our application Ser. No. 600,091, filed Dec. 30, 1910, entitled Quick motion controller.

What we have invented and what we desire to have protected by Letters Patent is expressed in claims as follows:

We claim:

1. In combination a chamber casing having a gas inlet and a fluid outlet, a water conduit having a wall in common with said casing, a valve controlling said conduit, and means operating when the kinetic energy of the gas particles in said casing rises to a predetermined limit to quickly open said valve and operative to subsequently close the valve.

2. In combination a chamber casing having a gas inlet and a fluid outlet, a water conduit having a wall in common with said casing, a valve controlling said conduit, and means operative to open said valve and operating when the kinetic energy of the gas particles in said casing subsequently falls to a predetermined limit to quickly close the valve.

3. In combination a chamber casing having a gas inlet and a fluid outlet, a water conduit having a wall in common with said casing, a valve controlling said conduit, and means operating when the kinetic energy of the gas particles in said casing rises to a predetermined limit to quickly open said valve and operating when such energy subsequently falls to a predetermined limit to quickly close the valve.

4. In combination a chamber casing having a gas inlet and a fluid outlet, a water conduit having a wall in common with said casing, a valve controlling said conduit, and means operating when the kinetic energy of the gas particles in said casing rises to a predetermined limit to open said valve with a quickness independent of the rapidity of such rise and operative to subsequently close the valve.

5. In combination a chamber casing having a gas inlet and a fluid outlet, a water conduit having a wall in common with said casing, a valve controlling said conduit, and means operative to open said valve and operating when the kinetic energy of the gas particles in said casing subsequently falls to a predetermined limit to close the valve with a quickness independent of the rapidity of such fall.

6. In combination a chamber casing having a gas inlet and a fluid outlet, a water conduit having a wall in common with said casing, and means operating when the kinetic energy of the gas particles in said casing rises to a predetermined limit to open said valve with a quickness independent of the rapidity of such rise and operating when such energy subsequently falls to a predetermined limit to close the valve with a quickness independent of the rapidity of such fall.

7. In combination a chamber casing having a gas inlet and a fluid outlet, a water conduit having a wall in common with said casing, a valve controlling said conduit, means for approximately neutralizing any tendency of water passing to said valve to affect its position, and means operating with a predetermined increase of the kinetic energy of the gas particles in said casing to open said valve and operative to subsequently close the valve.

8. In combination a chamber casing having a gas inlet and a fluid outlet, a water conduit having a wall in common with said casing, a valve controlling said conduit, means for approximately neutralizing any tendency of water passing to said valve to affect its position, and means operative to open said valve and operating with a subsequent predetermined decrease of the kinetic energy of the gas particles in said casing to close the valve.

9. In combination a chamber casing having a gas inlet and a fluid outlet, a water conduit having a wall in common with said casing, a valve controlling said conduit, means for approximately neutralizing any tendency of water passing to said valve to affect its position, and means operating with a predetermined increase of the kinetic energy of the gas particles in said casing to open said valve and operating with a subsequent predetermined decrease of such energy to close the valve.

10. In combination a main chamber casing having a fluid outlet from its lower part, a gas conduit leading into the top of said casing, a water conduit having a wall in common with said casing, a valve controlling said water conduit, and means operating when the kinetic energy of the gas particles in said gas conduit rises to a predetermined limit to quickly open said valve and operative to subsequently close the valve.

11. In combination a main chamber casing having a fluid outlet from its lower part, a gas conduit leading into the top of said casing, a water conduit having a wall in common with said casing, a valve controlling said water conduit, and means operative to open said valve and operating when the kinetic energy of the gas particles in said gas conduit subsequently falls to a predetermined limit to quickly close the valve.

12. In combination a main chamber casing having a fluid outlet from its lower part, a gas conduit leading into the top of said casing, a water conduit having a wall in common with said casing, a valve controlling said water conduit, and means operating when the kinetic energy of the gas particles in said gas conduit rises to a predetermined limit to quickly open said valve and operating when such energy subsequently falls to a predetermined limit to quickly close the valve.

13. In combination a main chamber casing having a fluid outlet from its lower part, a gas conduit leading into the top of said casing, a water conduit having a wall in common with said casing, a valve controlling said water conduit, and means operating when the kinetic energy of the gas particles in said gas conduit rises to a predetermined limit to open said valve with a quickness independent of the rapidity of such rise and operative to subsequently close the valve.

14. In combination a main chamber casing having a fluid outlet from its lower part, a gas conduit leading into the top of said casing, a water conduit having a wall in common with said casing, a valve controlling said water conduit, and means operative to open said valve and operating when the kinetic energy of the gas particles in said gas conduit subsequently falls to a predetermined limit to close the valve with a quickness independent of the rapidity of such fall.

15. In combination a main chamber casing having a fluid outlet from its lower part, a gas conduit leading into the top of said casing, a water conduit having a wall in common with said casing, a valve controlling said water conduit, and means operating when the kinetic energy of the gas particles in said gas conduit rises to a predetermined limit to open said valve with a quickness independent of the rapidity of such rise and operating when such energy subsequently falls to a predetermined limit to close the valve with a quickness independent of the rapidity of such fall.

16. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, and means operating with a predetermined increase of the kinetic energy of the gas particles in said gas conduit to open said valve and operative to subsequently close the valve.

17. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, and means operative to open said valve and operating with a subsequent predetermined decrease of the kinetic energy of the gas particles in said gas conduit to close the valve.

18. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, and means operating with a predetermined increase of the kinetic energy of the gas particles in said gas conduit to open said valve and operating with a subsequent predetermined decrease of such energy to close the valve.

19. In combination a chamber casing having a gas inlet and a fluid outlet, a water conduit having a wall in common with said casing, a valve controlling said conduit, and a thermostat affected by the temperature of the contents of said casing and operating at a predetermined high limit to open said valve and at a predetermined low limit to close the valve.

20. In combination a chamber casing having a gas inlet and a fluid outlet, a water conduit having a wall in common with said casing, a valve controlling said conduit, means for approximately neutralizing any tendency of water passing to said valve to affect its position, and a thermostat operating at predetermined high limit to open said valve and at a predetermined low limit to close the valve.

21. In combination a chamber casing having a gas inlet and a fluid outlet, a water conduit having a wall in common with said casing, a valve controlling said conduit, and a thermostat affected by the temperature of water flowing from said conduit and operating at a predetermined high limit to open said valve and at a predetermined low limit to close the valve.

22. In combination a chamber casing having a gas inlet and a fluid outlet, a water conduit having a wall in common with said casing, a valve controlling said conduit, means for approximately neutralizing any tendency of water passing to said valve to affect its position, and a thermostat affected by the temperature of water flowing from said conduit and operating at a predetermined high limit to open said valve and at a predetermined low limit to close the valve.

23. In combination a chamber casing having a gas inlet and a fluid outlet, a water conduit having a wall in common with said casing, a valve controlling said conduit, and a thermostat having as a part thereof a tube containing an expansive fluid with the tube in a position to be affected by the temperature of the contents of said casing and operating at a predetermined high limit to open said valve and at a predetermined low limit to close the valve.

24. In combination a chamber casing having a gas inlet and a fluid outlet, a water conduit having a wall in common with said casing, a valve controlling said conduit, means for approximately neutralizing any tendency of water passing to said valve to affect its position, and a thermostat having as a part thereof a tube containing an expansive fluid with the tube in a position to be affected by the temperature of the contents of said casing and operating at a predetermined high limit to open said valve and at a predetermined low limit to close the valve.

25. In combination a chamber casing having a gas inlet and a fluid outlet, a water conduit having a wall in common with said casing, a valve controlling said conduit, and a thermostat having as a part thereof a tube containing an expansive fluid with the tube in a position to be affected by the temperature of water flowing from said conduit and operating at a predetermined high limit to open said valve and at a predetermined low limit to close the valve.

26. In combination a chamber casing having a gas inlet and a fluid outlet, a water conduit having a wall in common with said casing, a valve controlling said conduit, means for approximately neutralizing any tendency of water passing to said valve to affect its position, and a thermostat having as a part thereof a tube containing an expansive fluid with the tube in a position to be affected by the temperature of water flowing from said conduit and operating at a predetermined high limit to open said valve and at a predetermined low limit to close the valve.

27. In combination a chamber casing having a gas inlet and a fluid outlet, a water conduit having a wall in common with said casing, a valve controlling said conduit, a quickly movable member adapted to quickly open or close said valve, and means operating when the kinetic energy of the gas particles in said casing rises to a predetermined limit to quickly move said member to so open said valve and operative upon the member subsequently to so close the valve.

28. In combination a chamber casing having a gas inlet and a fluid outlet, a water conduit having a wall in common with said casing, a valve controlling said conduit, a quickly movable member adapted to quickly open or close said valve, and means operative upon said member to so open said valve and operating when the kinetic energy of the gas particles in said casing subsequently falls to a predetermined limit to quickly move the member to so close the valve.

29. In combination a chamber casing having a gas inlet and a fluid outlet, a water conduit having a wall in common with said casing, a valve controlling said conduit, a quickly movable member adapted to quickly open or close said valve, and means operating when the kinetic energy of the gas particles in said casing rises to a predetermined limit to quickly move said member to so open said valve and operating when such energy subsequently falls to a predetermined limit to quickly move the member to so close the valve.

30. In combination a main chamber casing having a fluid outlet from its lower part, a gas conduit leading into the top of said casing, a water conduit having a wall in common with said casing, a valve controlling said water conduit, a quickly movable member adapted to quickly open or close said valve, and means operating when the kinetic energy of the gas particles in said gas conduit rises to a predetermined limit to quickly move said member to so open said valve and operative upon the member subsequently to so close the valve.

31. In combination a main chamber casing having a fluid outlet from its lower part, a gas conduit leading into the top of said casing, a water conduit having a wall in common with said casing, a valve controlling said water conduit, a quickly movable member adapted to quickly open or close said valve, and means operative upon said member to so open said valve and operating when the kinetic energy of the gas particles in said gas conduit subsequently falls to a predetermined limit to quickly move the member to so close the valve.

32. In combination a main chamber casing having a fluid outlet from its lower part, a gas conduit leading into the top of said casing, a water conduit having a wall in common with said casing, a valve controlling said water conduit, a quickly movable member adapted to quickly open or close said valve, and means operating when the kinetic energy of the gas particles in said gas conduit rises to a predetermined limit to quickly move said member to so open said valve and operating when such energy subsequently falls to a predetermined limit to quickly move the member to so close the valve.

33. In combination a chamber casing having a gas inlet and a fluid outlet, a water conduit having a wall in common with said casing, a valve controlling said conduit, means for approximately neutralizing any tendency of water passing to said valve to affect its position, a quickly movable member adapted to quickly open or close said valve, and means operating when the kinetic energy of the gas particles in said casing rises to a predetermined limit to quickly move said member to so open said valve and operative upon the member subsequently to so close the valve.

34. In combination a chamber casing having a gas inlet and a fluid outlet, a water conduit having a wall in common with said casing, a valve controlling said conduit, means for approximately neutralizing any tendency of water passing to said valve to affect its position, a quickly movable member adapted to quickly open or close said valve, and means operative upon said member to so open said valve and operating when the kinetic energy of the gas particles in said casing subsequently falls to a predetermined limit to quickly move the member to so close the valve.

35. In combination a chamber casing having a gas inlet and a fluid outlet, a water conduit having a wall in common with said casing, a valve controlling said conduit, means for approximately neutralizing any tendency of water passing to said valve to affect its position, a quickly movable member adapted to quickly open or close said valve, and means operating when the kinetic energy of the gas particles in said casing rises to a predetermined limit to quickly move said member to so open said valve and operating when such energy subsequently falls to a predetermined limit to quickly move the member to so close the valve.

36. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, a quickly movable member adapted to quickly open or close said valve, and means operating when the kinetic energy of the gas particles in said gas conduit rises to a predetermined limit to quickly move said member to so open said valve and operative upon the member subsequently to so close the valve.

37. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, a quickly movable member adapted to quickly open or close said valve, and means operative upon said member to so open said valve and operating when the kinetic energy of the gas particles in said gas conduit subsequently falls to a predetermined limit to quickly move the member to so close the valve.

38. In combination a main chamber casing having a fluid outlet from its lower part, a gas conduit leading into the top of said casing, a water conduit having a wall in common with said casing, a valve controlling said water conduit, means for approximately neutralizing any tendency of water passing to said valve to affect its position, a quickly movable member adapted to quickly open or close said valve, and means operating when the kinetic energy of the gas particles in said gas conduit rises to a predetermined limit to quickly move said member to so open said valve and operating when such energy subsequently falls to a predetermined limit to quickly move the member to so close the valve.

39. In combination a chamber casing having a gas inlet and a fluid outlet, a water conduit having a wall in common with said casing, a valve controlling said conduit, a device operating when actuated to open or close said valve, an intermediate connection leading from the outlet end of said conduit and having a flange at its outer end, an outlet connection having a flange secured to said former flange, there being a radial opening between said flanges, and a thermostat occupying said opening, extending into said intermediate connection and operative upon said device at a predetermined high limit to open said valve and at a predetermined low limit to close the valve.

40. In combination a chamber casing having a gas inlet and a fluid outlet, a water conduit having a wall in common with said casing, a valve controlling said conduit, means for approximately neutralizing any tendency of water passing to said valve to affect its position, a device operating when actuated to open or close said valve, an intermediate connection leading from the outlet end of said conduit and having a flange at its outer end, an outlet connection having a flange secured to said former flange, there being a radial opening between said flanges, and a thermostat occupying said opening, extending into said intermediate connection and operative upon said device at a predetermined high limit to open said valve and at a predetermined low limit to close the valve.

41. In combination a chamber casing having a gas inlet and a fluid outlet, a water conduit having a wall in common with said casing, a valve controlling said conduit, a device operating when actuated to open or close said valve, an intermediate connection leading from the outlet end of said conduit and having a flange at its outer end, an outlet connection having a flange secured to said former flange, there being a radial opening between said flanges and a thermostat occupying said opening, extending into said intermediate connection and operative upon said device at a predetermined high limit to open said valve and at a predetermined low limit to close it.

42. In combination a chamber casing having a gas inlet and a fluid outlet, a water conduit having a wall in common with said casing, a valve controlling said conduit and acted upon by the pressure of the incoming water supply so that the tendencies of such pressure to open and to close the valve approximately equalize, a device operating when actuated to open or close said valve, an intermediate connection leading from the outlet end of said conduit and having a flange at its outer end, an outlet connection having a flange secured to said former flange, there being a radial opening between said flanges, and a thermostat occupying said opening, extending into said intermediate connection and operative upon said device at a predetermined high limit to open said valve and at a predetermined low limit to close it.

43. In combination a chamber casing having a gas inlet and a fluid outlet, a plurality of water pipes mostly within said casing but having ends projecting through a casing wall, connections outside of said casing connecting said pipes in series and having openings in axial alinement with said pipes, detachable end pieces normally closing said openings, and a mercury well inserted into the inlet end of said series of conduits.

44. In combination a chamber having a gas inlet and a condensed gas outlet, a plurality of water pipes mostly within said chamber but near their ends projecting through a chamber wall, connections outside of said chamber connecting said pipes in series and having openings in axial alinement with said pipes, detachable end pieces normally closing said openings, and a mercury well inserted into the outlet end of said series of conduits.

45. In combination a chamber casing having a gas inlet and a fluid outlet, a plurality of water pipes mostly within said casing but having ends projecting through a casing wall, T's outside of said casing having at one end openings connecting with said pipe ends and having at their other ends openings in axial alinement with said pipes, detachable end pieces normally closing said latter openings, connections connecting the side openings of said T's in series, and a mercury well inserted into the inlet end of said series of conduits.

46. In combination a chamber casing having a gas inlet and a fluid outlet, a plurality of water pipes mostly within said casing but having ends projecting through a casing wall, T's outside of said casing having at one end openings connecting with said pipe ends and having at their other ends openings in axial alinement with said pipes, detachable end pieces normally closing said latter openings, connections connecting the side openings of said T's in series, and a mercury well inserted into the outlet end of said series of conduits.

47. In combination a chamber casing having a gas inlet and a fluid outlet, water pipes mostly within said casing but having ends projecting through a casing wall and having collars adjacent to said wall, gaskets around said pipes between said collars and said wall, pair couplings for each pipe end of which the inner member is screwed around its adjacent pipe end so as to compress said gasket between its collar and said wall, and a connecting piece connecting the outer member of one pair coupling with the outer member of another pair coupling so as to make a passage from pipe to pipe.

48. In combination a chamber casing having a gas inlet and a fluid outlet, water pipes mostly within said casing but having ends projecting through a casing wall, pair couplings for each pipe end of which the inner member is screwed around the adjacent pipe end, T's for each outer member of said couplings having at one end openings connecting with said outer members at their other ends openings in axial alinement with said pipes, detachable end pieces normally closing said latter openings, and nipples connecting the side openings of said T's in series.

49. In combination a chamber casing having a gas inlet and a fluid outlet, water pipes mostly within said casing but having ends projecting through a casing wall and having collars adjacent to said wall, gaskets around said pipes between said collars and said wall, pair couplings for each pipe end of which the inner member is screwed around the adjacent pipe end so as to compress the adjacent gasket between the collar and said wall, T's for each outer member of said couplings having at one end openings connecting with said outer members and at their other ends openings in axial alinement with said pipe, detachable end pieces normally closing said latter openings, and nipples connecting the side openings of said T's in series.

50. In combination a chamber casing having a gas inlet and a fluid outlet, water pipes mostly within said casing but having ends projecting through a casing wall and having collars within said casing adjacent to said wall, gaskets around said pipes between said collar and said wall, pair couplings for each pipe end of which the inner member is screwed around the adjacent pipe end so as to compress said gasket between its collar and said wall, and a connecting piece connecting the outer member of one pair coupling with the outer member of another pair coupling so as to make a passage from pipe to pipe.

51. In combination a chamber casing having a gas inlet and a fluid outlet, water pipes mostly within said casing but having ends projecting through a casing wall and having collars within said casing adjacent to said wall, gaskets around said pipes between said collars and said wall, pair couplings for each pipe end of which the inner member is screwed around the adjacent pipe end so as to compress the adjacent gasket between the collar and said wall, T's for each outer member of said couplings having at one end openings connecting with said outer members and at their other ends openings in axial alinement with said pipes, detachable end pieces normally closing said latter openings, and nipples connecting the side openings of said T's in series.

GEORGE P. CARROLL.
FRANK N. ROEHRICH.

Witnesses:
JOHN E. PRAGER,
JESSE H. SWIEDLER.